United States Patent [19]

Nemirovsky et al.

[11] Patent Number: 5,752,273
[45] Date of Patent: May 12, 1998

[54] APPARATUS AND METHOD FOR EFFICIENTLY DETERMINING ADDRESSES FOR MISALIGNED DATA STORED IN MEMORY

[75] Inventors: Mario Nemirovsky, San Jose; Alexander Perez, Sunnyvale; Robert James Divivier, San Jose; Narendra Sankar, Sunnyvale, all of Calif.

[73] Assignee: National Semiconductor Corporation, Santa Clara, Calif.

[21] Appl. No.: 863,092

[22] Filed: May 23, 1997

Related U.S. Application Data

[63] Continuation of Ser. No. 450,154, May 26, 1995, abandoned.

[51] Int. Cl.$^6$ .................................................. G06F 12/00
[52] U.S. Cl. ........................... 711/201; 711/219; 711/220
[58] Field of Search ........................................ 399/411, 412, 399/421.1, 421.09

[56] References Cited

U.S. PATENT DOCUMENTS

| | | | |
|---|---|---|---|
| 3,916,388 | 10/1975 | Shimp et al. | 395/411 |
| 4,507,731 | 3/1985 | Morrison | 395/411 |
| 4,654,781 | 3/1987 | Schwartz et al. | 395/421.09 |
| 4,814,976 | 3/1989 | Hansen et al. | 395/411 |
| 5,051,894 | 9/1991 | Phillips et al. | 395/412 |
| 5,189,319 | 2/1993 | Fung et al. | 326/86 |
| 5,204,953 | 4/1993 | Dixit | 395/421.1 |
| 5,254,888 | 10/1993 | Lee et al. | 327/298 |
| 5,259,006 | 11/1993 | Price et al. | 375/356 |
| 5,321,823 | 6/1994 | Grundmann et al. | 395/565 |
| 5,349,651 | 9/1994 | Hetherington et al. | 395/417 |
| 5,404,473 | 4/1995 | Papworth et al. | 395/588 |
| 5,408,626 | 4/1995 | Dixit | 395/421.1 |
| 5,471,598 | 11/1995 | Quattromani et al. | 395/449 |

FOREIGN PATENT DOCUMENTS

| | | |
|---|---|---|
| 377431 | 7/1990 | European Pat. Off. . |

OTHER PUBLICATIONS

IBM Technical Disclosure Bulletin, vol. 10 No. 1, Jun. 1967, pp. 31–33, J. G. Adler, et al. "Determination of Completion of Operhand Fetching".

IBM Technical Disclosure Bulletin vol. 27 No. 8, Jan. 1985, pp. 4781–4784, D. Meltzer, et al. "Cache Addressing to Minimize Off–Boundary Breakage".

IBM Technical Disclosure Bulletin vol. 32 No. 6A, Nov. 1989, pp.127–128, "Decoder–Initated Prefetching For Long OP Instructions".

IBM Technical Disclosure Bulletin vol. 32 No. 5A, Oct. 1989, p. 109, "CPU In–Page Only Instruction Prefetcher".

Serra, Micaela & Dervisoglu, Bulent I, "Testing", Chapter 79, *The Electrical Engineering Handbook*, Richard C. Dorf, Editor–in–Chief, pp. 1808–1837, CRC Press.

L–T Wang et al., "Feeback Shift Registers For Self–Testing Circuits", *VLSI Systems Design*, Dec. 1986.

Masakazu Shoji, "CMOS Dynamic Gates", Chapter 5, *At&T CMOS Digital Circuit Technology*, Prentice Hall, 1988, pp. 210–257.

Guthrie, Charles, "Power–On Sequencing For Liquid Crystal Displays; Why, When, And How", *Sharp Application Notes*, Sharp Corporation, 1994, pp. 2–1 thru 2–9.

Bernd Moeschen, "NS32SP160—Feature Communication Controller Architecture Specification", *National Semiconductor*, Rev. 1.0, May 13, 1993.

Agarwal, Rakesh K., *80x86 Architecture and Programming, vol. II: Architecture Reference*, Chapter 4, Prentice Hall, 1991, pp. 542–543.

Intel486 Microprocessor Family Programmer's Reference Manual, Intel Corporation, 1993, pp. 3–27 thru 3–30, 26–59 thru 26–61, 26–203, 26–204, 26–214, 26–215, 26–257, 26–258, 26–272, 26–273.

"8237A High Performance Programmable DMA Controller (8237A, 8237A-4, 8237A-5)", *Peripheral Components*, Intel, 1992, pp. 3–14 thru 3–50.

Kane, Gerry, "R2000 Processor Programming Model", Chapter 2, *MIPS RISC Architecture*, MIPS Computer Systems, Inc. pp. 2–6 thru 2–7.

Hennessay, John, et al., "Interpreting Memory Addresses", *Computer Architecture A Quantitative Approach*, pp. 95–97, Morgan Kaufmann Publishers, Inc. 1990.

*PowerPC601 Reference Manual*, IBM, 1994, Chapter 9, "System Interface Operation", pp. 9–15 thru 9–17.

Intel Corp. Microsoft Corp., *Advanced Power Mangement (APM) BIOS Interface Specification*, Revision 1.1, Sep. 1993.

Inter Corporation, *i486 Micro Processor Hardware Reference Manual*, Processor Bus, pp. 3–28 thru 3–32.

Primary Examiner—David M. Moore
Assistant Examiner—Kevin Verbrugge
Attorney, Agent, or Firm—Limbach & Limbach L.L.P.

[57] ABSTRACT

An apparatus and method for efficiently generating the consecutive addresses needed to access misaligned or doubleword length data stored in the memory of a general purpose microprocessor. The apparatus shares the address generation operations between a small 3 bit adder, typically contained in the bus unit, and the execution unit. Control logic is used to determine whether a data misalignment situation exists based on the length of the data which is to be retrieved and the starting address of the data. When misalignment is indicated, the control unit acts to assign the address calculations to either the 3 bit adder alone or the execution unit together with the 3 bit adder depending upon how much the present address must be incremented to obtain the new addresses.

10 Claims, 2 Drawing Sheets

APPARATUS AND METHOD FOR EFFICIENTLY DETERMINING ADDRESSES FOR MISALIGNED DATA STORED IN MEMORY

This is a continuation of application Ser. No. 08/450,154 filed on May 26, 1995, now abandoned.

TECHNICAL FIELD

The present invention relates to the accessing of data stored in the memory of a computer, and more specifically, to an apparatus and method for efficiently determining the sequential addresses used to access misaligned data stored in the memory of a microprocessor.

BACKGROUND OF THE INVENTION

A general purpose computer typically has its memory space divided into multiple data storage locations, each of which is accessed by means of an address which corresponds to that location. The memory locations can be used for storing an application program, data to be used in executing a program, or a stack which stores return addresses, parameters passed by a calling routine, and temporary variables assigned by a routine.

In many computers the memory locations are aligned at the boundaries of 16 bit words, with the location consisting of two 8 bit (1 byte) half-words. In a computer having memory locations aligned at the boundaries of 32 bit words, the memory location is composed of two 16 bit half-words. This means that each unique address specifies a memory location which consists of a 16 bit or 32 bit wide memory space for the storage of data.

A bus is used to send addresses to the memory and transfer the data contained at the memory locations corresponding to those addresses to the microprocessor. In some situations the computer architecture may be designed such that the data width of the bus is less than that of the memory locations. For example, a bus may have a width of 16 bits and be used in an architecture which uses 32 bit wide memory spaces. In such a case, if it was desired to read a piece of data 32 bits long, then at least two memory accesses would be required. A first memory access would transfer the first 16 bits of the data and a second memory access would transfer the last 16 bits of the data As will be discussed, depending on how the data is aligned in memory, this may require generating more than one address in order to retrieve the data from memory.

When accessing the memory, a single address typically corresponds to both half-words at the location associated with that address. In the case of a 32 bit wide bus with the data stored in memory so that all 32 bits are stored at the two half-words corresponding to the same memory location, than a single memory address can be used to access the data. In this case, a single memory access at address K would retrieve both half-word 0 and half-word 1 at that location. If the data width of the bus is 16 bits instead of 32 bits, then multiple memory accesses would be needed to retrieve the entire 32 bits of data. In such a case, a first memory access would have an address of K and would access half-word 0 at that location, while a second access would have an address of K and would access half-word 1 at that location. Note that in the case of a 16 bit wide memory location, where both half-words (bytes) are stored at the two half-words corresponding to the same memory location, than a single memory address can be used to access the data in the case of a 16 or 32 bit wide bus.

However, in some situations multiple addresses must be generated in order to perform multiple accesses of memory. One situation in which this occurs is when data is misaligned in memory. This refers to the situation in which the data is not aligned so that it starts with the beginning byte or half-word of an address location. As an example, with a 16 bit wide memory location and a 2 byte sized piece of data to be accessed, if the data is aligned in memory such that the first byte is located at byte 1 of address location K while the second byte is located at byte 0 of address location K+2, then two memory addresses will be required to read the data and transfer it out of memory. The first memory access would be at address location K, byte 1, followed by a second memory access at location K+2, byte 0. In this situation, the computer must access two consecutive regions of memory (and hence compute two different addresses) in order to retrieve the data. Note that if the data had been properly aligned with the partitioned memory regions, then only one access at location K, bytes 0 and 1 would be required.

A similar problem to that encountered with misaligned data occurs when doubleword length data (32 bits long in the case of 16 bit wide memory locations and 64 bits long in the case of 32 bit wide memory locations) is placed in memory and aligned at either the zero-th or first byte of a memory location. In such a case, the length of the data is such that at least two memory locations are needed to store the data This requires the generation of multiple memory addresses in order to complete the task of retrieving the data.

The generation of multiple memory addresses for use in accessing misaligned data degrades the performance of a computer because it requires additional clock cycles to access the data. It also requires special control circuitry and additional hardware to implement. This can significantly increase the processing overhead (exception logic, address translation logic, etc.) when data processing instructions attempt to access misaligned data. For these reasons, many modern computers do not permit access to misaligned data. Instead, these systems utilize a complex alignment network to prevent misalignment of data. Although accessing doubleword length data is not the same situation as misaligned data, it does present the same challenge, i.e., the need to efficiently generate multiple memory addresses.

In those computer systems which allow access to misaligned data, the consecutive memory addresses needed to access the data are typically generated by using a full adder or incrementor in the bus unit. Another approach used is to generate the addresses using the execution unit's arithmetic logic units. Using a full adder or incrementor in the bus unit to solve the misalignment problem has the result of increasing the complexity, size, and cost of the product. If instead the execution unit is used to generate the addresses, then the efficiency of the overall system is sacrificed because the address generation keeps the execution unit busy during times when it could be put to other uses.

What is desired is a means of generating the consecutive addresses needed to access misaligned or doubleword length data stored in the memory of a general purpose microprocessor which is more efficient and results in a less complex system than the approaches currently used.

SUMMARY OF THE INVENTION

The present invention is directed to an apparatus and method for efficiently generating the consecutive addresses needed to access misaligned or doubleword length data stored in the memory of a general purpose microprocessor. The apparatus shares the address generation operations between a small 3 bit adder, typically contained in the bus unit, and the execution unit. Control logic is used to determine whether a data misalignment situation exists based on the length of the data which is to be retrieved and the starting address of the data. When data misalignment is indicated, the control unit acts to assign the address calculations to either the 3 bit adder or the execution unit depending upon how much the present address must be incremented to obtain the new addresses. If the misaligned address is within an eight byte boundary, then the 3 bit adder is used. When the misaligned address is larger, the execution unit is used to perform the address calculation. As most address calculations can be performed with the 3 bit adder, this approach frees up the execution unit to perform other tasks.

Further objects and advantages of the present invention will become apparent from the following detailed description and accompanying drawings.

DETAILED DESCRIPTION OF THE PREFERRED EMBODIMENT

Figure 1:
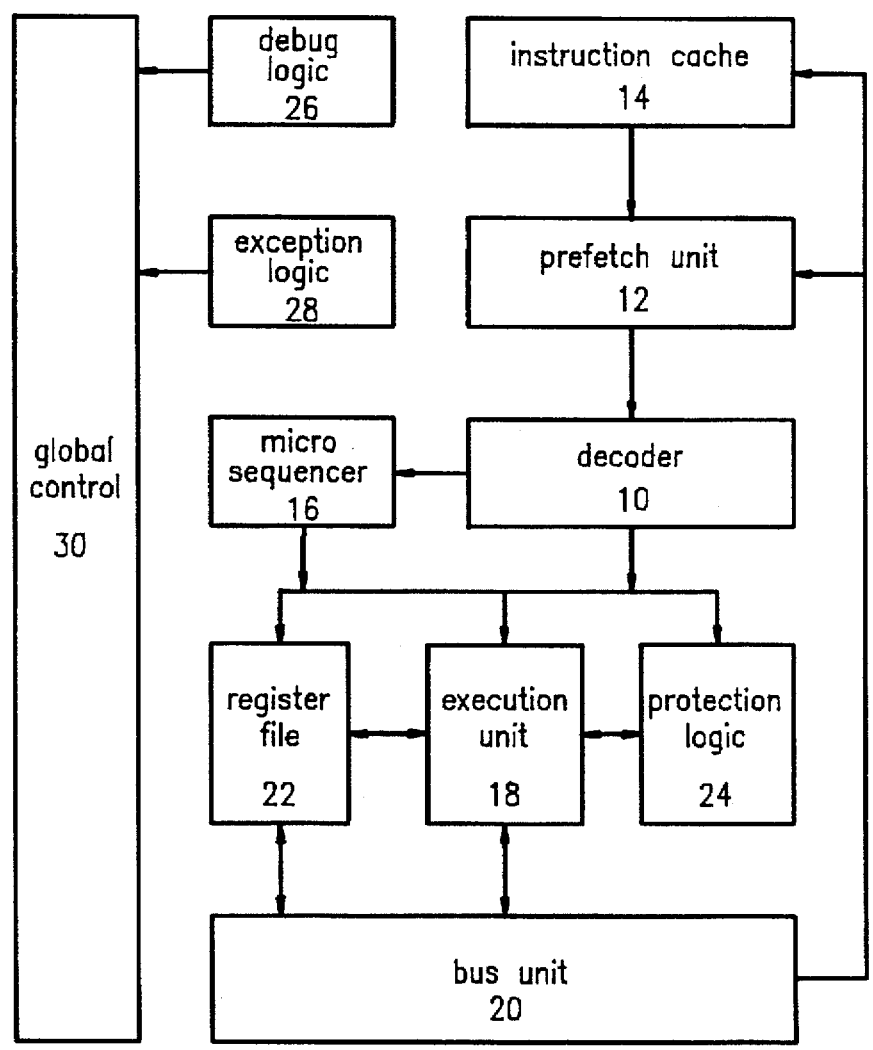
FIG. 1 is a block diagram of the architecture of a microprocessor which includes apparatus for efficiently generating addresses for accessing misaligned data according to the method of the present invention.

FIG. 1 is a block diagram of the architecture of a microprocessor 1 which includes apparatus for efficiently generating addresses for accessing misaligned data according to the method of the present invention. Although the figure shows the basic elements of a particular microprocessor architecture, it is intended only for purposes of example. The apparatus and method of the present invention may be implemented in other forms and are applicable to general purpose microprocessors having different architectures.

The microprocessor architecture of FIG. 1 employs a three stage pipeline using microprogrammed control. The three primary stages of the pipeline are the decode, execute and writeback stages. The decode stage contains the decode unit 10, the prefetch buffer 12, the instruction cache 14, and the microsequencer 16. Prefetch buffer 12 is 16 bytes wide and is designed as a two tier unit. Prefetch unit 12 acts to keep instruction decoder 10 fully supplied with all the bytes of the instruction it is currently decoding. Prefetch unit 12 interfaces with instruction cache 14 and is designed to fetch ahead of the decode stage. This look-ahead mechanism improves the efficiency with which the microprocessor operates.

Instruction cache 14 contains 1K bytes organized as a direct map with a line size of 8 bytes. Cache 14 checks on the bus to avoid stale data due to self modifying code.

Decoder 10 is capable of decoding simple instructions in a single cycle. Prefixes and complex instructions can take more than one cycle to decode. Microsequencer 16 steps through the decoded microcode for the instructions.

The execute stage fetches operands and executes the instructions, and also computes the memory addresses. Most microprocessor architectures make use of a segmented memory space, with many addressing modes being used to access this space. The use of a segmented memory space means that to obtain the physical address that actually goes on the bus, at least one addition must be performed, that of the segment base and the offset within that segment. This can be further complicated by the computation of the segment offset, which can have up to three parts; a base, an index, and a displacement.

As noted, execution unit 18 performs the address computation. Segment limit checking is also done at this point to prevent segment overruns. The computed linear address is sent to bus unit 20 for dispatch to the external world.

The execute stage also utilizes the architectural register file 22 and protection logic unit 24. Register file 22 resolves the source and destination information for all the operations performed in the execute stage. It also allows bypassing of results from either the output of the arithmetic and logic unit (ALU) contained in execution unit 18 or from a load operation from memory. This helps to reduce pipeline backups due to data dependencies.

The writeback stage includes bus interface unit 20, debug logic unit 26 and register writeback logic. In this stage the memory access is initiated and completed. An update of register file 22 is also performed. A second writeback substage permits the completion of an independent register operation, out of order, while a memory write access is pending. In this architecture the memory access is pipelined, which allows a new read/write operation to be initiated every cycle.

As indicated in FIG. 1, the microprocessor core is divided into 11 blocks. These blocks are the prefetch unit 12, decoder unit 10, microsequencer 16, register file unit 22, execution unit 18, protection logic unit 24, exception logic unit 28, debug logic unit 26, bus unit 20, global control unit 30, and instruction cache 14.

Prefetch unit 12 consists of two eight byte registers that are filled in from either instruction cache 14 or directly from memory. Decode unit 10 gets an instruction from prefetch unit 12 and generates the entry microcode address for the instruction, register addresses, immediate values, displacement values and segment information. Decoder 10 also generates information for some of the exceptions.

Microsequencer 16 controls the process of stepping through the instruction microcode. It generates the next microcode address and performs the look-ups in the micro (code) ROM. The micro-ROM address can come from decoder 10 if a new instruction is started, from the microcode if the present instruction is not finished, or from exception logic unit 28 in the case of exceptions.

Register file unit 22 reads the operands, resolves the bypasses, generates constants, and aligns operands for an instruction. The architecture registers and the selectors (i.e., the segment look-up registers) are implemented in this block. Registers contained in register file unit 22 can be accessed either as a single byte, a word (2 bytes), or a doubleword (4 bytes).

Execution unit 18 has two major functions. One is to perform all the arithmetic and logic operations. For this function, execution unit 18 has an arithmetic and logic unit (ALU) and a barrel shifter. The second function(s) of execution unit 18 are address computation (linear address generation) and limit checking.

Bus unit 20 is the interface between the microprocessor core and the external world. An important feature of this unit is the ability to support pipelined memory access where a memory access is initiated before the previous one has finished. In this mode, the external DRAMs which constitute the memory are divided into pages, typically 4K bytes long.

As long as an access is within one page in the DRAM, single cycle reads and writes to memory can be sustained. If a page miss occurs, then it takes 3 cycles to complete that access. DRAM, SRAM and ROM accesses can also be supported with wait states and nonpipelined memory accesses.

Global control unit 30 is the supervisor of the entire architecture. This unit controls the stepping of the instruction pipeline. Interlocks, control of the exception handling, and process shutdown are also handled by this unit. Exception logic unit 28 prioritizes and resolves all the exceptions and external interrupts. This includes the software interrupts, arithmetic exceptions, protected mode exceptions, and other faults and traps. Protection logic unit 24 is responsible for any protection mechanisms implemented in the architecture. Debug logic unit 26 includes all the debug registers and implements the instruction and data breakpoints.

Figure 2:
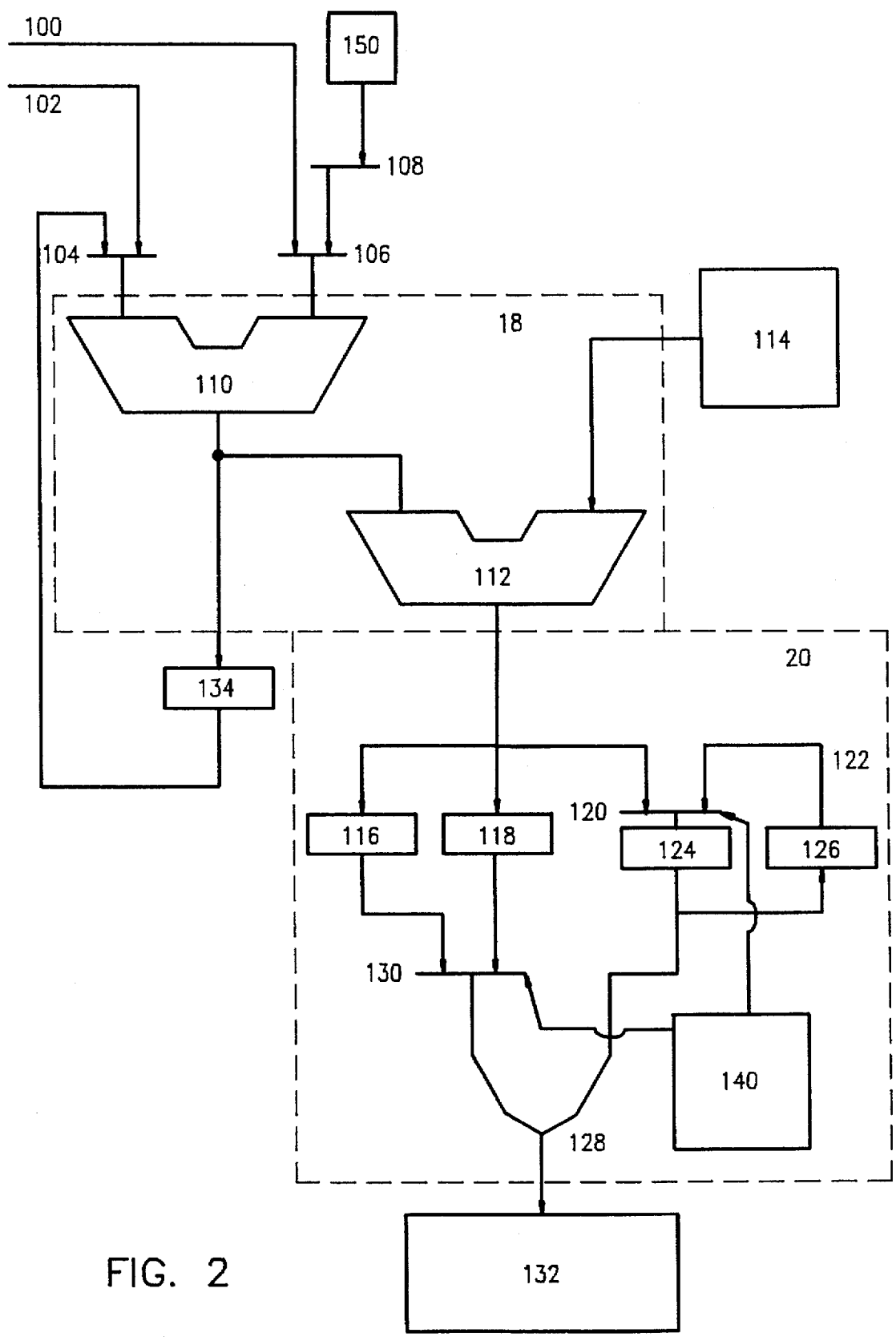
FIG. 2 is a detailed diagram showing the portions of the architecture of the microprocessor of FIG. 1 which are used to generate addresses for accessing misaligned data according to the method of the present invention.

FIG. 2 is a detailed diagram showing the portions of the architecture of microprocessor 1 of FIG. 1 which are used to generate addresses for accessing misaligned or doubleword length data according to the method of the present invention. The dotted box labelled 18 contains elements of the microprocessor architecture which are typically contained in the execution unit, while the box labelled 20 contains elements typically found in the bus unit.

Data paths 100 and 102 provide data from the decoder 10 or register file 22 (shown in FIG. 1) which is input to elements 106 and 104, respectively. Elements 104 and 106 are shown as two-input-single-output logic elements or switches. They typically take the form of a data multiplexer, with control logic selecting which of the two inputs is routed out of the element as the output. The outputs of elements 104 and 106 provide the inputs to arithmetic logic unit (ALU) 110. In the preferred embodiment of the present invention, ALU 110 is principally used to implement adding operations.

The outputs of elements 104 and 106 (which in most instances is the data provided along data paths 100 and 102) are used by ALU 110 to calculate the address in memory which is accessed for the purpose of writing data to memory or reading data from memory. Depending upon the addressing mode being used, the data may consist of an offset value, displacement value, or other term used in computing a memory address.

ALU 110 is used to compute the sum of the data input to that unit. This value represents the total offset amount from a base address for the memory location which is to be accessed. The output of ALU 110 is provided as an input to arithmetic logic unit (ALU) 112. The output of ALU 110 is also provided as an input to register 134. The output of register 134 serves as the second input to element 104. As with ALU 110, in the preferred embodiment of the present invention, ALU 112 is principally used to implement adding operations. The second input to ALU 112 is the base address of the first memory location in the segment of memory to be accessed. This base address value is obtained from register 114. ALU 112 performs an add operation on its two inputs to produce an output which represents the complete 32 bit address of the memory location to be accessed.

The output of ALU 112 is provided to a 29 bit misalignment register 116 and to a 29 bit general register 118. The 3 least significant bits of the 32 bit address output by ALU 112 are provided to element 120. Division of the 32 bit output of ALU 112 into 29 bit and 3 bit components is accomplished by routing the bus lines carrying the output of ALU 112 to the appropriate locations. Element 120 is shown as a two-input-single-output logic element or switch. As discussed previously, it typically takes the form of a data multiplexer, with control logic selecting which of the two inputs is routed out of the element as the output. The other input to element 120 is provided along data path 122.

The output of element 120 serves as the input to register 124. The output of register 124 is provided along two data paths. The first data path from element 124 serves as an input to location 128, while the second data path serves as an input to element 126, which in the preferred embodiment of the present invention is a 3 bit incrementor. The output of 3 bit incrementor 126 is provided along data path 122 and serves as the second input to element 120.

The outputs of misalignment register 116 and general register 118 are provided as inputs to element 130, which again takes the form of a two-input-single-output logic element or switch. The output of element 130 serves as the second data path feeding into location 128. The two data paths feeding into location 128 are combined into a single data path at that point. The single data path leaving location 128 is provided as the input to memory 132.

As noted, the output of ALU 112 is a 32 bit address, the 29 most significant bits of which are provided to registers 116 and 118. Control unit 140 performs two primary functions: (1) it determines if consecutive memory addresses need to be generated, i.e., if a misalignment problem or doubleword length data access exists; and (2) it controls the operation of elements 130 and 120 in response to that determination. A data misalignment or doubleword length data situation is determined based on the starting address of the memory location to be accessed and the length of the data which is to be retrieved from memory 132. Note that some or all of the functions performed by control unit 140 may be performed by other stages of microprocessor 1 of FIG. 1.

If there is no need to generate consecutive addresses, control unit 140 causes element 130 to pass the output of register 118 to location 128 as the output of element 130. Control unit 140 similarly causes element 120 to pass the 3 least significant bits of the address generated by ALU 112 to register 124. The output of register 124 is provided as the second input to location 128. At location 128, both input data paths are combined into a single address 32 bit which is then passed to memory 132. The function occurring at location 128 may be implemented in the form of two sets of bus lines (a 29 bit set and a 3 bit set) which are fed to a common destination. The 32 bit address produced is used to access the location in memory 132 which holds the desired data However, in accordance with the present invention, when control unit 140 determines that a data misalignment problem or doubleword length data access exists, it controls elements 130 and 120 in such a manner as to produce the consecutive addresses needed to access the data in memory. The present invention divides the misalignment or doubleword length data problems into two cases: (1) situations where the address to be generated is within an 8 byte block in memory; and (2) situations where the address to be generated is outside of an 8 byte block in memory.

In the situation in which control unit 140 determines that the address to be generated is within an 8 byte block, 3 bit incrementor 126 is used to increment the 3 least significant bits of the address provided by ALU 112 to element 120. A 3 bit incrementor is capable of incrementing the address by a value up to $2_3$, or 8 bits (values of 0 to 7). The incremented address is provided by incrementor 126 along data path 122 to element 120. Control unit 140 then causes element 120 to pass the incremented 3 bit value, rather than the 3 bit value provided by ALU 112. Control unit 140 also causes element 130 to select the value passed to it from misalignment register 116 as the output of element 130. Location 128 thus receives as a data path containing the 29 most significant bits of the address passed to it by misalignment register 116 and a data path containing the incremented value of the 3 least significant bits which is passed by the actions of element 120 and register 124.

The address data passed to location 128 by element 130 and register 124 is combined to form the 32 bit address of the next memory location which is to be accessed. Thus, when control unit 140 detects a misalignment problem, during a first clock cycle the initial address is calculated and control unit 140 causes the contents of register 118 and the 3 least significant bits of the address output by ALU 112 to be passed to memory 132. In the next clock cycle, the 3 least significant bits of the address are incremented and combined with the contents of misalignment register 116 to form the incremented address. This new address is then passed to memory 132.

In the situation in which control unit 140 and/or global control unit 30 determine that the address to be generated is outside of an 8 byte block, ALU 110 of execution unit 18 is used to generate the incremented address(es). In this case, during a first clock cycle the initial address is calculated and control unit 140 again causes the contents of register 118 and the 3 least significant bits of the address output by ALU 112 to be passed to memory 132. During the next clock cycle, the contents of register 134 is passed back to ALU 110 by means of controlling the action of element 104. This value, which is the initially calculated offset value for the first memory address, is then incremented to obtain the offset for the next address location. The process of incrementing the offset is accomplished by combining the offset of the initial address with a value of 8 which is supplied by register 150. This value is passed through element 108 to element 106. Element 108 may have other inputs which are selected by controlling the operation of element 108. Element 106 is controlled to select the incrementing value from register 150 instead of the data supplied along path 100 to send to ALU 110 as the second input. ALU 110 combines the offset value from register 134 and the incrementing value from register 150 to obtain the offset value for the new address. This value is provided as an input to ALU 112. The second input to ALU 112 is again the base address of the first memory location in the segment of memory to be accessed. This base address value is obtained from register 114. ALU 112 performs an add operation on its two inputs to produce an output which represents the complete 32 bit address of the memory location to be accessed.

The output of ALU 112 is provided to 29 bit misalignment register 116 and to 29 bit general register 118. The 3 least significant bits of the 32 bit address output by ALU 112 are provided to element 120. Control unit 140 now causes element 130 to pass the output of register 118 to location 128 as the output of element 130. Control unit 140 similarly causes element 120 to pass the incremented value of the 3 least significant bits of the address generated by ALU 112, as generated by incrementor 126, to register 124. The output of register 124 is provided as the second data path to location 128. At location 128, the two data paths are combined into a single address which is then passed to memory 132. This address is used to access that location in memory 132 which holds the desired data. It is noted that because this address is based on the incremented offset value provided by ALU 110, it can be used to access a memory location which differs from that accessed during the first clock cycle, One of the primary benefits of using misalignment register 116 is for implementing read-modify-write operations that involve a misalignment situation. An example of a read-modify-write a instruction is ADD WordPtr [1007], AX. This instruction performs the operation(s) of taking the data located at WordPtr [1007] and replacing it with the sum of that data and the contents of register AX. In order to implement this instruction, three operations must be carried out: (1) a data read at the memory location WordPtr [1007] must be carried out; (2) the addition operation must be carried out; and (3) the result must be stored at the memory location WordPtr [1007].

The first step involves a misalignment situation, and the execution unit ALU's would be used to perform the misalignment calculation. The result of this calculation would then be stored in register 116. This means that when step (3) is performed, the misaligned address does not have to be recalculated.

Generation of the memory addresses for doubleword length data is accomplished in a similar manner. Control unit 140 determines if multiple addresses will need to be generated based on the initial memory address and the length of the data to be accessed. Control unit 140 then controls the routing of the address data during the clock cycles so that an initial address is calculated by ALU 110 and ALU 112, followed by the generation of the next address by use of either the 3 bit incrementor 126 alone or ALU 110/ and the 3 bit incrementror 126 together.

Thus, in accordance with the present invention, an apparatus and method for generating multiple addresses to access memory is based on apportioning the address generation operations between either a 3 bit incrementor alone or a full adder which is typically contained in an arithmetic logic unit together with a 3 bit incrementor. The division of the address generation between the two adders is controlled by a control unit which determines if a data misalignment or doubleword data access is indicated, based on the initial address location and the length of the data to be accessed.

The first address in the group of addresses is calculated by adding the address components which comprise the offset value together to obtain the complete offset. This value is then added to the base address value to obtain a complete 32 bit address. This address is then incremented to obtain the next address to access. The incrementing is carried out by one of two procedures, depending upon whether the new address is within an 8 byte block or outside of an 8 byte block. If the new address is within an 8 byte block, a control unit utilizes the 29 most significant bits of the previous address and an incremented value of the 3 least significant bits (provided by means of a 3 bit incrementor) to generate the new address. If the new address lies outside an 8 byte block, the control unit causes an incremented offset value to be produced during the first add operation. This value is then combined with the base value to form a new 32 bit address. The 29 most significant bits of this address and an incremented value of the 3 least significant bits provided by a 3 bit incrementor are then used to generate the new address.

The present invention has the capability of generating the multiple addresses needed to access misaligned or doubleword length data in a manner which is more efficient than currently used methods. This improvement in efficiency results from using a 3 bit incrementor to perform as much of the address generation as possible, instead of relying on a full adder or using the arithmetic logic units in the execution unit. This saves development time, device size and cost, and frees up the execution unit to perform more essential tasks.

The invention embodiments described herein have been implemented in an integrated circuit which includes a number of additional functions and features which are described in the following co-pending, commonly assigned patent applications, the disclosure of each of which is incorporated herein by reference: U.S. patent application Ser. No. 08/451, 319, entitled "DISPLAY CONTROLLER CAPABLE OF ACCESSING AN EXTERNAL MEMORY FOR GRAY SCALE MODULATION DATA"; U.S. patent application Ser. No. 08/451,965, entitled "SERIAL INTERFACE CAPABLE OF OPERATING IN TWO DIFFERENT SERIAL DATA TRANSFER MODES"; U.S. patent application Ser. No. 08/453,076, abandoned, entitled "HIGH PERFORMANCE MULTIFUNCTION DIRECT MEMORY ACCESS (DMA) CONTROLLER"; U.S. patent application Ser. No. 08/452,001, abandoned entitled "OPEN DRAIN MULTI-SOURCE CLOCK GENERATOR HAVING MINIMUM PULSE WIDTH"; U.S. patent application Ser. No. 08/451,503, entitled "INTEGRATED CIRCUIT WITH MULTIPLE FUNCTIONS SHARING MULTIPLE INTERNAL SIGNAL BUSES ACCORDING TO DISTRIBUTED BUS.ACCESS AND CONTROL ARBITRATION"; U.S. Pat. No. 5,655,139, entitled "EXECUTION UNIT ARCHITECTURE TO SUPPORT x86 INSTRUCTION SET AND x86 SEGMENTED ADDRESSING"; U.S. Pat. No. 5,652,718, entitled "BARREL SHIFTER"; U.S. patent application Ser. No. 08/451,204, entitled "BIT SEARCHING THROUGH 8, 16, OR 32-BIT OPERANDS USING A 32-BIT DATA PATH"; U.S. Pat. No. 5,687,102, entitled "DOUBLE PRECISION (64-BIT) SHIFT OPERATIONS USING A 32-BIT DATA PATH"; U.S. patent application Ser. No. 08/451,571, entitled "METHOD FOR PERFORMING SIGNED DIVISION"; U.S. Pat. No. 5,682,339, entitled "METHOD FOR PERFORMING ROTATE THROUGH CARRY USING A 32-BIT BARREL SHIFTER AND COUNTER"; U.S. patent application Ser. No. 08/451, 434, entitled "AREA AND TIME EFFICIENT FIELD EXTRACTION CIRCUIT"; U.S. Pat. No. 5,617,543, entitled "NON-ARITHMETICAL CIRCULAR BUFFER CELL AVAILABILITY STATUS INDICATOR CIRCUIT"; U.S. patent application Ser. No. 08/445,563, entitled "TAGGED PREFETCH AND INSTRUCTION DECODER FOR VARIABLE LENGTH INSTRUCTION SET AND METHOD OF OPERATION"; U.S. Pat. No. 5,546,353, entitled "PARTITIONED DECODER CIRCUIT FOR LOW POWER OPERATION"; U.S. Pat. No. 5,469,147, entitled "CIRCUIT FOR DESIGNATING INSTRUCTION POINTERS FOR USE BY A PROCESSOR DECODER"; U.S. Pat. No. 5,598,112, entitled "CIRCUIT FOR GENERATING A DEMAND-BASED GATED CLOCK"; U.S. Pat. No. 5,583, 453, entitled "INCREMENTOR/DECREMENTOR"; U.S. patent application Ser. No. 08/451,150, entitled "A PIPELINED MICROPROCESSOR THAT PIPELINES MEMORY REQUESTS TO AN EXTERNAL MEMORY"; U.S. Pat. No. application Ser. No. 08/451,198, entitled "CODE BREAKPOINT DECODER"; U.S. Pat. No. 5,680, 564, entitled "TWO TIER PREFETCH BUFFER STRUCTURE AND METHOD WITH BYPASS"; U.S. patent application Ser. No. 08/445,564 abandoned entitled "INSTRUCTION LIMIT CHECK FOR MICROPROCESSOR"; patent application Ser. No. 08/452,306, abandoned entitled "A PIPELINED MICROPROCESSOR THAT MAKES MEMORY REQUESTS TO A CACHE MEMORY AND AN EXTERNAL MEMORY CONTROLLER DURING THE SAME CLOCK CYCLE"; U;S. patent application Ser. No. 08/452,080, abandoned entitled "APPARATUS AND METHOD FOR EFFICIENT COMPUTATION OF A 486™ MICROPROCESSOR COMPATIBLE POP INSTRUCTION"; U.S. patent application Ser. No. 08/451, 742, entitled "METHOD OF IMPLEMENTING FAST 486™ MICROPROCESSOR COMPATIBLE STRING OPERATION"; U.S. Pat. No. 5,659,712, entitled "A PIPELINED MICROPROCESSOR THAT PREVENTS THE CACHE FROM BEING READ WHEN THE CONTENTS OF THE CACHE ARE INVALID"; U.S. patent application Ser. No. 08/451,507, now abandoned, entitled "DRAM CONTROLLER THAT REDUCES THE TIME REQUIRED TO PROCESS MEMORY REQUESTS"; U.S. patent application Ser. No. 08/451,420, entitled "INTEGRATED PRIMARY BUS AND SECONDARY BUS CONTROLLER WITH REDUCED PIN COUNT"; U.S. Pat. No. 5,612,637, entitled "SUPPLY AND INTERFACE CONFIGURABLE INPUT/OUTPUT BUFFER"; U.S. Pat. No. application Ser. No. 08/451,744, abandoned entitled "CLOCK GENERATION CIRCUIT FOR A DISPLAY CONTROLLER HAVING A FINE TUNEABLE FRAME RATE"; U.S. patent application Ser. No. 08/451,206, entitled "CONFIGURABLE POWER MANAGEMENT SCHEME"; U.S. patent application Ser. No. 08/452,350, entitled "BIDIRECTIONAL PARALLEL SIGNAL INTERFACE"; U.S. patent application Ser. No. 08/452,094, entitled "LIQUID CRYSTAL DISPLAY (LCD) PROTECTION CIRCUIT"; U.S. patent application Ser. No. 8/450, 156, entitled "DISPLAY CONTROLLER CAPABLE OF ACCESSING GRAPHICS DATA FROM A SHARED SYSTEM MEMORY"; U.S. Pat. No. 5,541,935, entitled "INTEGRATED CIRCUIT WITH TEST SIGNAL BUSES AND TEST CONTROL CIRCUITS"; and U.S. patent application Ser. No. 08/445,568, entitled "DECODE BLOCK TEST METHOD AND APPARATUS".

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed.

We claim:

1. An apparatus for generating memory addresses for accessing misaligned data stored in a memory, comprising:

means for generating an offset value for an address, wherein the offset value corresponds to an amount by which a memory location is offset from a base address;

means for generating the base address;

means for adding the offset value and the base address to form a complete memory address;

control means for determining whether a piece of data stored at the complete memory address is misaligned, and if the piece of data is misaligned, for determining if generation of a memory address for the piece of data will produce a carry bit;

means for forming an incremented complete memory address when the control means determines that the piece of a memory added of data is misaligned and that generation of a memory address for the piece of data will produce a carry bit;

means for dividing the complete memory address and the incremented complete memory address into a set of most significant bits and a set of least significant bits;

means for incrementing a value of the set of least significant bits when the control means determines that the data is misaligned; and means for combining the set of most significant bits and the incremented set of least significant bits to form a new address for memory, when the control means determines that the data is misaligned.

2. The apparatus for generating memory addresses of claim 1, wherein the means for adding the offset value and the base address to produce a complete memory address is an arithmetic logic unit.

3. The apparatus for generating memory addresses of claim 1, wherein the control means determines whether a piece of data is misaligned based on a length of the data and the complete memory address.

4. The apparatus for generating memory addresses of claim 1, wherein the means for incrementing a value of the set of least significant bits is a 3 bit adder.

5. The apparatus for generating memory addresses of claim 4, wherein the 3 bit adder is contained in a bus unit.

6. The apparatus for generating memory addresses of claim 1, wherein the means for generating an offset value for an address generates the offset by incrementing the offset value from a previous address.

7. A method of generating memory addresses for accessing misaligned data stored in a memory, comprising:

generating an offset value for an address, wherein the offset value corresponds to an amount by which a memory location is offset from a base address;

generating the base address;

adding the offset value and the base address to form a complete memory address;

determining whether a piece of data stored at the complete memory address is misaligned and if the piece of data is misaligned, determining whether generation of an address for the piece of data will produce a carry bit;

incrementing the offset value and adding the incremented offset value to the base address to form an incremented complete memory address when the piece of data is misaligned and generation of a memory address for the piece of data will produce a carry bit;

dividing the complete memory address into a set of most significant bits and a set of least significant bits when the piece of data is misaligned and generation of a memory address for the piece of data will not produce a carry bit;

dividing the incremented complete memory address into a set of most significant bits and a set of least significant bits when the piece of data is misaligned and generation of a memory address for the piece of data will produce a carry bit;

incrementing a value of the set of least significant bits when it is determined that the data is misaligned; and combining the set of most significant bits and the incremented set of least significant bits to form a new address for memory, when it is determined that the data is misaligned.

8. The method of generating memory addresses of claim 7, wherein the offset value is generated by incrementing the offset value of a previous address.

9. The method of generating memory addresses of claim 7, wherein the determination of whether a piece of data stored at the complete memory address is misaligned is based on a length of the data and the complete memory address.

10. The apparatus of claim 1, wherein the means for forming an incremented complete memory address further comprises:

means for incrementing the offset value and adding the incremented offset value to the base address.

* * * * *

UNITED STATES PATENT AND TRADEMARK OFFICE
CERTIFICATE OF CORRECTION

PATENT NO.: 5,752,273
DATED: May 12, 1998
INVENTOR(S): Mario Nemirovsky et al.

It is certified that error appears in the above-identified patent and that said Letters Patent is hereby corrected as shown below:

In Col. 10, line 57, delete "of a memory added".

Signed and Sealed this

Twenty-first Day of July, 1998

Attest:

BRUCE LEHMAN

Attesting Officer

Commissioner of Patents and Trademarks